April 4, 1939.　　　　C. J. FITCH　　　　2,153,178

METHOD OF AND MEANS FOR SIGNALING

Filed Dec. 7, 1934　　　4 Sheets-Sheet 1

INVENTOR.
Clyde J. Fitch
BY
ATTORNEY

April 4, 1939.    C. J. FITCH    2,153,178
METHOD OF AND MEANS FOR SIGNALING
Filed Dec. 7, 1934    4 Sheets-Sheet 2

INVENTOR.
Clyde J. Fitch
by
ATTORNEY

April 4, 1939.  C. J. FITCH  2,153,178
METHOD OF AND MEANS FOR SIGNALING
Filed Dec. 7, 1934  4 Sheets-Sheet 3

INVENTOR.
Clyde J. Fitch
BY
ATTORNEY

April 4, 1939.  C. J. FITCH  2,153,178

METHOD OF AND MEANS FOR SIGNALING

Filed Dec. 7, 1934  4 Sheets-Sheet 4

FIG. 10.

Patented Apr. 4, 1939

2,153,178

UNITED STATES PATENT OFFICE 2,153,178

METHOD OF AND MEANS FOR SIGNALING

Clyde J. Fitch, Jersey City, N. J., assignor to International Business Machines Corporation, New York, N. Y., a corporation of New York Application December 7, 1934, Serial No. 756,443

13 Claims. (Cl. 178—67)

This invention relates to signal translating apparatus and in particular to a new method and means of transmission of signal indications in the form of electrical impulses or representations predicated for its operation upon the use of conversion means which is practically free from inertia and frequency limitations.

Insofar as its fundamental features are concerned the methods herein disclosed are applicable to any form of remotely controlled units and are particularly adaptable to be used in connection with facsimile, television, tele-typewriter transmission and tele-control apparatus.

More in detail this invention relates to means for converting signal indications automatically into electrical impulses or representations having similar characteristics, without the use of any mechanical relays or moving parts. The signal pulses may then be transmitted in a novel manner by a radiating system or sent directly over a line to a remote point to be again converted into legible signals.

One of the objects of the present invention is to provide a transmitting system that may convert automatically signal indications into signal impulses characteristic of the indications.

Another object of the present invention is to provide signal translating means by means of which signals may be converted into current impulses at a higher rate of speed than possible heretofore.

Still another object of the present invention is to provide signal translating apparatus by means of which combination of coded signal impulses may be set up simultaneously.

Still another object of the above invention is to provide signal translating means which will at a high speed and automtaically convert signal indications into current impulses, the duration of which may be predetermined by a novel means incorporated in the translating means.

Still another object is to provide a synchronous translating apparatus without the use of any rotating or moving parts.

Briefly and broadly, the above objects are attained by employing a single phase synchronous alternating current supply and transforming it into a plurality of phases equally spaced electrically, a combination of which may be set up simultaneously to represent any form of signal indications, and which again are similarly converted into legible signals corresponding to the ones initiating the impulses.

In order to disclose the present invention briefly and concisely one form of well-known automatic translating apparatus will be shown for illustrative purposes, namely, an automatic tele-typewriting system applicable to both line and radio networks.

Depression of the typewriter key selects a predetermined number of a plurality of out-of-phase signals, which are generated by special transformers with their secondaries arranged to obtain impulses or representations of varying phases, the wave shapes of which are then altered by thermionic tubes to obtain a series of short impulses with greatly reduced wave shapes, but the characteristics of which are similar, and are selected simultaneously for their transmission so as to be received at a remote station and separated in a manner similar to their transmission to operate the typewriter keys.

An additional feature of this invention is the provision whereby the duration of the initiated signal representation may be sustained for predetermined periods.

Further and other objects of the present invention will be hereinafter set forth in the accompanying specification and claims and shown in the drawings which by way of illustration is what I now consider to be the best mode in which I have contemplated applying that principle. Other embodiments of the invention employing the same or equivalent principle may be used and structural changes made as desired by those skilled in the art without departing from the present invention and within the spirit of the appended claims.

The apparatus as arranged in accordance with the present invention can be roughly divided into three units, the first of which is the translating means associated therewith for initiating and receiving the signal representations, the second being the transmitting unit consisting of the phase generating and wave shaping and converting units, and the third similar means to separate the representations to operate the receiving means in accordance with the signals initiated. These units will now be described in the order given above.

*Translating units*

As mentioned hereinbefore for illustrative purposes, this invention is shown as embodying one well-known form of translating unit and of the type disclosed in the copending application Serial No. 676,654 filed June 20, 1933, and hence requires only the following brief description.

Figure 1:
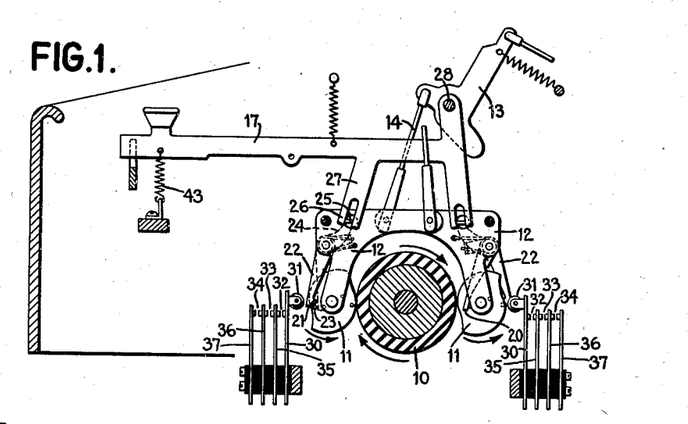
Fig. 1 shows a partial section of so much of a translating unit as is necessary to illustrate one possible embodiment of the invention.

Referring to the drawings, and in particular to Figure 1, in the embodiment illustrated in the drawings, well-known means are provided for actuating the typebars (not shown) by power operated devices comprising a power driven roller 10.

A cam 11 is pivoted on one arm of a bell crank lever 12 pivoted in the frame, the other arm of which is operatively connected with one arm of a bell crank lever 13 by means of link 14. The other arm of lever 13 is connected to the type bars (not shown) in a well-known manner and fully disclosed in the aforesaid application.

The lever 12 is actuated by the cam 11 when the latter engages the driven roller 10 to be operated thereby. The engagement of the cam 11 with the power roller is controlled by means of the key lever 17 in a manner which will now be described.

The cam 11 is resiliently engaged by a spring-pressed arm 20 which tends to turn it into engagement with the power driven roller or stop 21 on a lever 22 pivoted on the bell crank 12 and normally arranged in the path of a lug 23 on the cam. When the lever 22 swings to move its stop out of the path of the lug, the arm 20 swings the cam into engagement with the power roller to be actuated thereby to swing the bell crank 12 to actuate its connected mechanism. The lever 22 has an arm 24 which is provided with an offset projection 25 at its end which projects laterally through an opening in the bell crank 12 and engages the bifurcated lower end 26 of an arm 27 of a key lever 17 pivoted on the common rod 28.

It is obvious then that depression of a key lever 17 releases the revolubly mounted cam 11 to engage and be actuated by power roller 10 in turn operating bell crank 12 and its attached links to cause the associated mechanism, such as the key bars, to be operated. In addition to actuating the several typebars the revolubly mounted cams are adapted to make and break circuits employed in the transmitting units the purpose of which will be understood as the description progresses.

Upon release of the cam 11, the ensuing operation thereof causes the contact blade 30 by virtue of its attached cam follower roller 31 adapted to engage the cam during its partial revolution, to be urged away from the power roller 10 to close the contacts 32, 33, and 34 in the order named. Since the cam turns exactly one-half of a revolution before being arrested, the spring blade 30 returns to its normal position as shown in the drawings by virtue of its own resiliency, similarly the spring blades 35, 36 and 37 return to their normal position to open the corresponding contacts 32, 33 and 34.

It will be understood that the usual number of key bars and power devices with their associated mechanisms are provided, but only one of them are shown for the sake of clearness.

Figure 1A:
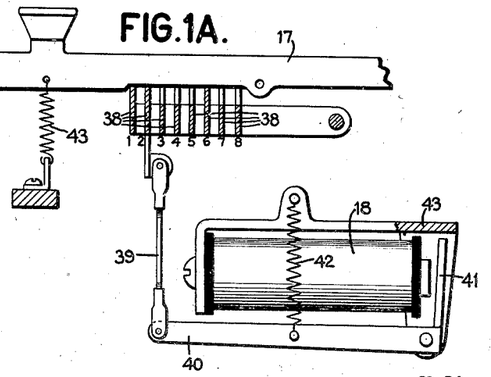
Fig. 1A shows a detailed arrangement of the mechanism embodied in a receiving translating unit.

Referring now to Figure 1A, a partial view of one of the key bars 17 of the transmitter translating unit just described is shown to indicate the construction of a receiving unit including a plurality of pivoted permutation bars 38 disposed beneath all the included key bars of the unit and applied in a manner well-known in the art. For example, eight permutation bars may be used as shown in the drawings and adapted so that a group of three of the eight bars may be selected or actuated to operate a key lever. Suitably attached to each permutation bar 38 is a link 39 to an extension arm 40 of armature 41 of magnet 18 all of which may be suitably disposed beneath the keyboard of the typewriter. Spring 42 attached to the magnet frame 43 and arm 40 tend to urge each permutation bar upwardly upon deenergization of the magnet, thereby holding the key bars in an inoperative position. Upon energization of any three magnets 18 it is seen that three bars 38 are depressed to permit one key bar 17 to be actuated by virtue of an attached spring 43, thus operating the associated mechanism and corresponding type bar.

Figure 1B:
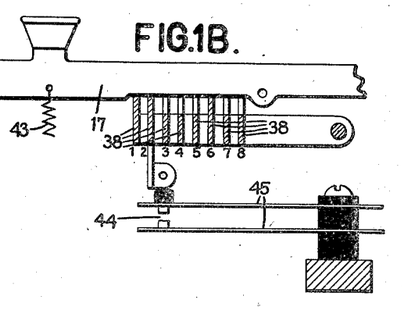
Fig. 1B shows a modification of the unit shown in Fig. 1.

A modification of the transmitting unit previously described is shown in Fig. 1B, employing similar pivoted permutation bars 38 disposed beneath the key bars 17, each bar adapted to operate and close a separate set of switch contacts 44 when depressed. The particular key bar 17 shown in the drawings is adapted to engage permutation bars 1, 2 and 6, so that upon its depression the said bars 38 are urged downwardly simultaneously to operate the sets of contacts 44 corresponding to the said bars.

Upon release of the key, the resiliency of the spring blades 45 restore the key bar to its normal position. By this arrangement it is evident that only eight switch contacts 44 are necessary to be operated in contradistinction to the group of contacts closed by the individual revoluble cams 11 for each key bar depressed (Fig. 1). The purpose of the switch contacts will be explained in conjunction with the description and operation of the transmitting system, the explanation of which will now be given.

*Transmitting units*

It was mentioned hereinbefore that this system is a combinational code system, the various combinations of which are set up electrically and simultaneously for transmission. In order to be consistent throughout the description the system will be described as employing a three unit signal code and which of course is understood for illustrative purposes solely. The system employs single phase synchronous alternating current at the transmitter and receiver stations and which is sub-divided into equally electrically spaced phases, for example, if eight phases are chosen each one would be spaced twenty-two and a half electrical degrees apart.

Figure 7:
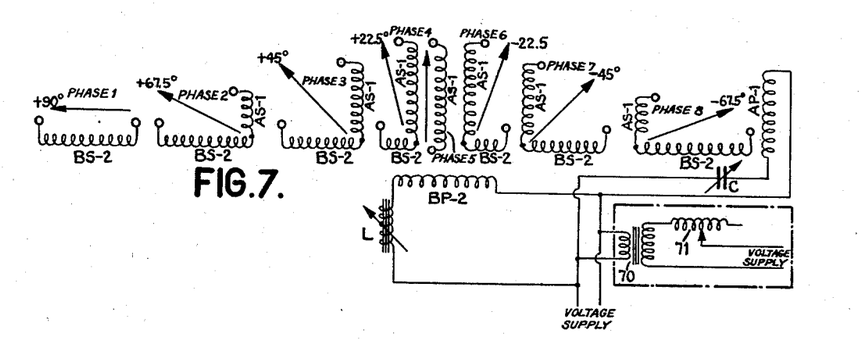
Fig. 7 shows diagrammatically and vectorially one arrangement of the transformer windings as embodied in the invention.

In the following, one method of generating the plurality of phases will be shown. Referring now to Fig. 7, it is shown diagrammatically and vectorially how two transformers A and B, each having a plurality of secondary windings depending upon the number of phases to be generated, are connected for converting the single phase current into a plurality of phases.

In the primary circuit of one, AP—1, is a condenser C to cause the current to lead the voltage. In the primary of the other, BP—2 is an inductance L causing the current to lag behind the voltage. The values of C and L are chosen so that the current in primary winding AP—1 is 90 degrees out of phase with the current in the primary winding BP—2 and the voltage across each of the primaries is the same.

Primary AP—1 in the drawings is shown to have seven secondary windings AS—1, and primary BP—2 has seven secondaries BS—2 connected as shown. It is to be noted that the turns ratio of the individual secondary windings vary for each phase connection, and the turns ratio of the separate connected windings of both transformers are such that the voltage output for the open circuits are equal. The phase direction is shown vectorially by the arrows for each separate phase to be developed. This arrangement and connection of the primaries and secondaries of the said transformers results in eight separate secondary circuits as shown spaced twenty-two and a half electrical degrees apart, each phase of which is adapted to deliver equal voltages across the free ends of the secondary circuits.

It is obvious that a plurality of let us say 60 cycle sine waves cannot be transmitted simultaneously over the working channel of a single radio network, or line, therefore to overcome this difficulty the wave shape similar to that of sine wave, is changed, one method of which is as follows.

Figure 4:
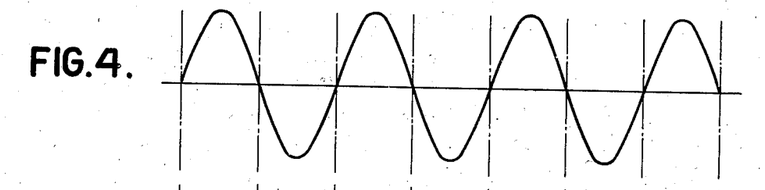
Figs. 4, 4A and 4B shows the relationship of the wave shapes of the currents energizing various units of the invention.
Figure 4A:
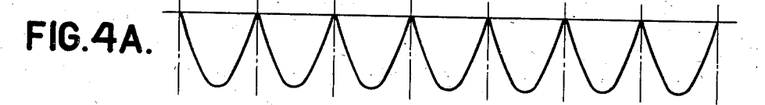
Figure 4B:
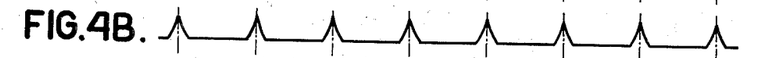

Referring now to Figure 4, a sinusoidal wave form of the alternating current is shown and similar to the current wave forms developed by each of the plurality of secondary circuits previously explained. These sinusoidal current waves may then be impressed upon any type of full wave rectifier to change the current wave shape to conform to that shown in Fig. 4A which is representative of the pulsating current wave forms. In turn the rectified current wave forms may then be applied as follows, if the voltage rectified wave forms corresponding and similar to those of the current wave forms shown in Figure 4A are impressed on the grid of a thermionic tube, for example, and the voltage is sufficient to drive the tube far below its plate-current cut-off point, the shape of the current waves in the plate circuit will be altered to conform to the shapes shown in Figure 4B. The characteristics of the circuits may be selected and adjusted so that the length of the base of the short impulses shown in Fig. 4B are approximately one-eighth of the distance between the impulses. Of course it is obvious that the particular wave shapes may vary according to the characteristics of the circuits employed, and it is evident by the method just described many different wave shapes of the resultant current may be obtained, or by conversions based upon the same principle, so that in order for the description not to be too verbose, one preferred method is shown for illustrative purposes only and it is understood that the invention is not to be limited to the specific example embodied herein.

In further explanation of the principle of conversion just described, this entire action may take place automatically in a single thermionic tube, a type well-known in the art which is a combination of a full wave rectifier and triode in one envelope. The electrical connections for this type of tube may be shown in Figure 3, and in which the alternating voltage sinusoidal wave is applied across the center tapped resistor R—1 so that the wave shape of the current flowing through this resistor, or the voltage across it, is similar to that shown in Figure 4. The resistor R is connected between the cathode of the tube 50 and the center tap of resistor R—1, the terminals of which are connected to the two rectifier plates of the said tube. Therefore the wave shape of the rectified current through resistor R, and the voltage across this resistor is similar to that shown of the pulsating wave in Figure 4A. The grid of tube 50 may also be connected to the center tap of the resistor R—1, the voltage across resistor R may be applied between the grid and cathode of the said tube. If the said voltage is of sufficient value the tube may be driven far below its plate current cut-off point to obtain a plate current having a wave shape similar to that shown in Figure 4B, and impressed accordingly on the connected output circuit.

The circuit just described has shown one method of converting a single phase sinusoidal wave into a series of short impulses having any predetermined wave form, all of which, of course, are similar. There will be two impulses per cycle, or 120 impulses per second if a 60 cycle supply source is connected thereto. These generated impulses, as is evident, are accurately spaced, and since as shown they occur when the sinusoidal wave form of the current passes through zero.

Neither the spacing nor the amplitude of the short impulses will change with variations in the supply voltage. It is obvious from this feature alone that this system affords extreme advantages for remotely controlled systems.

Figure 3:
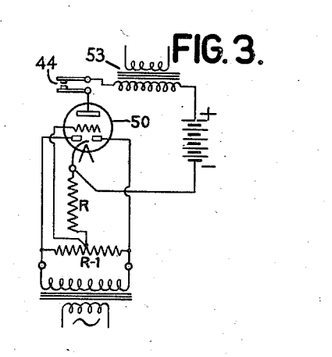
Fig. 3 is a circuit diagram of one form of wave shape generator.
Figures 5, 5A:
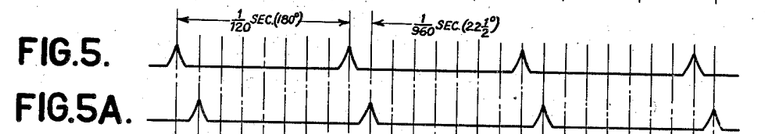
Figs. 5 and 5A to 5H inclusive, show the relationship of the out-of-phase impulses for one embodiment of the invention.
Figures 5B, 5C:
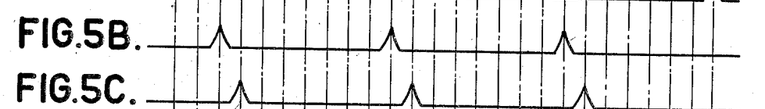
Figure 5D:
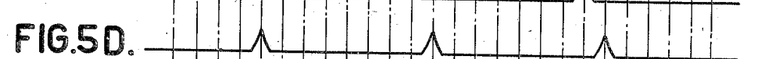
Figure 5E:
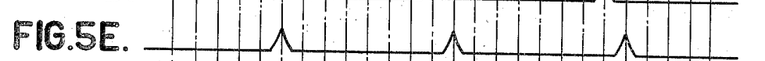
Figure 5F:
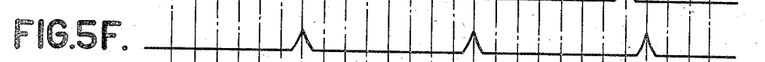
Figures 5G, 5H, 6:
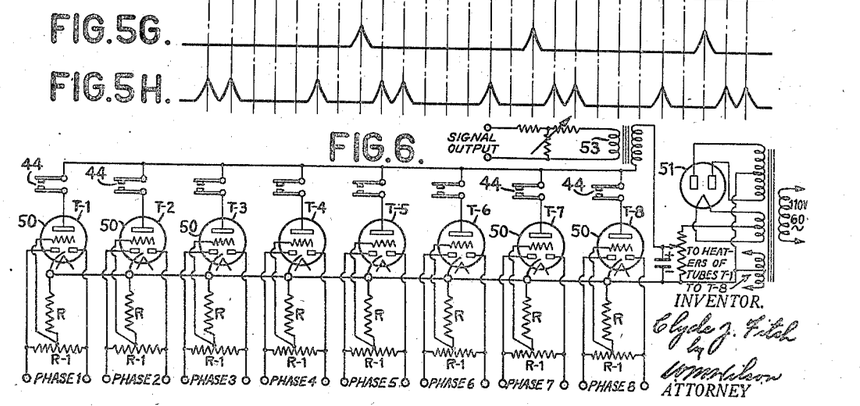
Fig. 6 is a circuit diagram of one unit of the transmitting system.

From the foregoing description, it will be understood that if the eight separate phases spaced twenty-two and a half electrical degrees apart as described in connection with Figure 7 are connected to eight electrical circuits embodying a tube of the type described in connection with Fig. 3, so that the terminals of each secondary winding of each phase are joined with the terminals of the separate resistors R—1, eight series of short predetermined impulses similar to those shown in Fig. 4B may be generated. The relationship of the generated impulses just described is shown in Figures 5 to 5G inclusive for each particular phase, namely 1 to 8, and needs no further description. It will be noted that these generated impulses of the various phases occur at different times, since the phases are spaced twenty-two and a half electrical degrees or one-nine hundred and sixtieth of a second apart when a 60 cycle supply source is employed. Since no two impulses overlap or occur at the same time, any number of phases may be transmitted over the selected type of radiating system simultaneously.

Referring now to Figure 6, a complete wave converting circuit system for the eight separate phases is shown. Further description of its connections and operation is not necessary since the circuit shown in connection with Figure 3 is applied to each of the tubes T—1 to T—8. The usual cathode and anode potential supply source is shown in connection with the standard rectifier tube 51. In addition thereto in each of the anode circuits contacts 44 are shown to connect the said anode circuits to a common circuit embodying the output transformer 53, its secondary to be connected to any form of radiating or indicating system.

The contacts 44 represent the individual contacts explained in conjunction with the translating unit and shown in Figure 1B. It is remembered that each permutation bar 38 is adapted to operate and close its individual and corresponding contacts 44, and also that the depression of a key lever 17 is adapted to operate a group of three permutation bars which in turn close the three corresponding contacts 44 simultaneously. Let it be assumed that the key bar 17 illustrated in the figure referred to and shown to be adapted to operate permutation bars 1, 2 and 6 and accordingly close the contacts 44 shown to be connected in the plate circuits of the tubes T—1 to T—8 for the phases 1, 2 and 6, therefore, upon the depression of this key bar 17 and upon closure of the corresponding contacts 44, impulses for phases 1, 2 and 6 are generated and impressed simultaneously upon the common output circuit including transformer 53 and in this manner transmitted forward to the connected system. In Figure 5H is shown a typical signal wave shape produced by the depression of the said key bar shown to transmit phases 1, 2 and 6. Current of this wave shape exists in the output circuit so long as the corresponding contacts 44 are closed, namely so long as the key bar 17 is depressed.

It is well to include here a brief description of applying the power or cam operated contacts, as explained in connection with Fig. 1 to the transmitting circuits explained, before continuing with further description of the receiving circuits of this system.

Figure 2:
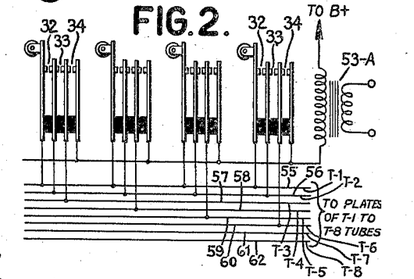
Fig. 2 shows a connection diagram which may be employed in connection with the embodiment shown in Fig. 1.

Referring now to signals 1, 2, and 6, instead of having the plates of the individual tubes T—1 to T—8 connected to the individual contacts 44, they are connected to the respective common conductors 55 to 62 (Fig. 2). Several of the cam operated switches are shown connected to the common anode conductors and are representative of further connections for additional cam operated switches to be connected thereto and which may be according to any predetermined code combination selected. The contacts 32, 33 and 34 are connected to the individual anode conductors so that the closure of each set of contacts is adapted to condition the circuits for the corresponding phase generating and converting circuits.

It was explained in conjunction with the description of the cam operated switches shown in Fig. 1 that the contacts 34 are adapted to be closed after the closure of contacts 32 and 33. It is to be noted that the common output circuit including the output transformer 53—A is not energized until the closure of contact 34 and therefore the output circuit is energized by the three generated and converted impulses selected by the contacts 32, 33 and 34 and impressed thereupon simultaneously to be transmitted forward in a manner similar to that previously described. It was mentioned hereinbefore, that the signals remained impressed on the common output circuit so long as the controlling contacts, in this particular description 32, 33 and 34 are closed, it is seen therefore that the length of time that contact is made depends upon the distance between the cam 11 and its related switch and upon the adjustment of the said contacts so that the signals may be transmitted continuously for certain predetermined and automatically controlled periods of duration.

*Receiving selector units*

Broadly, the receiving circuits for selecting or separating the transmitted signals consist of a plurality of separate generating and wave converting circuits similar to the ones explained in conjunction with the transmitting units, that is a single phase synchronous alternating current is split up or transformed into a plurality of similar and corresponding phases as at the transmitting unit, upon reception of the transmitted signals consisting of various combinations of the phases, the circuits at the receiving unit representing like phases permit the particular phase transmitted and corresponding thereto to actuate connected translating units in a particular manner.

Figure 9:
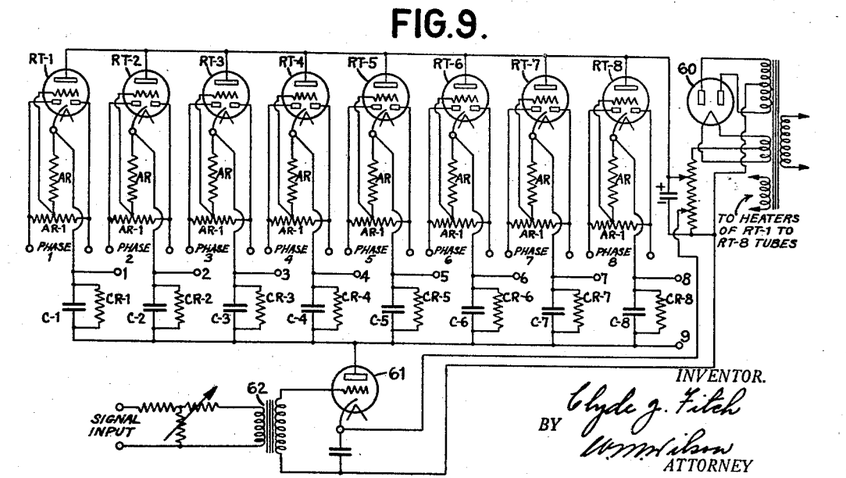
Fig. 9 is a circuit diagram of one form of receiving circuit showing the principle of the invention.

To continue further with the example set forth, the receiving system will require eight circuits to generate the phases and convert the wave forms similarly as explained hereinbefore. Referring now to Figure 9 the RT tubes, of which there are eight, are similar to the type explained and designated T in Figure 6. The triode plates, however, are all connected together and to the same plate potential source provided by the standard supply source designated by the rectifier tube 60 and its associated circuits. The cathodes are separate but similarly connected to the resistor AR as resistor R in Fig. 6, and included in each cathode circuit is a condenser C and shunted resistor CR the remaining terminals of which are all joined to a common terminal 9, the purpose of which will be understood as the description progresses, and also connects to the plate of a single triode thermionic tube 61.

The cathode of this tube is supplied by negative potential from the said power supply, and the positive side of the power supply connects to the triode plates of the RT tubes as mentioned previously. The tube 61 is normally biased to cut-off, so that no plate current can pass through the resistor CR and RT tubes.

The rectifier plates of the RT tubes are connected to the resistors AR—1 and to the corresponding secondary terminals of similar transformers previously described and shown in Fig. 7. It is to be understood that the single phase supply is synchronously maintained so that the supply at the transformers in the transmitting circuits is in phase with the supply at the transformers in the receiving circuits. When the transformer supply is connected to the source supply or to a synchronized supply network no synchronizing problems are involved in this type of system. It will be shown later how the system may be applied at points or stations employing single phase supply which are not in phase or synchronism.

It will be simpler and more comprehensible to explain the separation of the signals by first showing how one phase may be selected or separated.

Let it be assumed that the contacts 44, in Fig. 6, in the plate circuit of tube T—1 representing phase 1 is closed. This will cause the transmission of short impulse signals of phase 1 (Fig. 5)

at the rate of 120 impulses per second in a 60 cycle system.

At the receiver these signal impulses are applied to the primary winding of transformer 62 (Fig. 9) the secondary of which is connected to the grid of thermionic tube 61, and thus apply the signal voltage across the grid and cathode of this tube. Thus, every 1/120th of a second, tube 61 will allow plate current to pass. But, since these signal impulses of phase 1 are in phase only with the plate current which is allowed to pass through the tube RT—1, the grid of which is controlled by the phase 1 generated at the receiver, current can flow only through the tubes RT—1 and 61. This current flow produces a voltage drop across the resistor CR—1 included in the cathode circuit of tube RT—1 and causes the condenser C—1 connected across the said resistor to be charged. The time constant of the circuit including condenser C—1 and resistor CR—1 governs the actual voltage charge maintained across the said condenser.

If phase 2 is transmitted instead of phase 1 as just described, the signal impulses of phase 2 would be received 1/960th of a second later and would allow current to pass only through tube RT—2, the grid of which is controlled by the phase 2 generator. If both phases were set up simultaneously for transmission, both tubes RT—1 and RT—2 would pass current and the condensers C—1 and C—2 connected to the cathodes of the said tubes would be charged. Therefore, by setting up or conditioning any three of the eight phases simultaneously any three of the eight condensers C can be charged substantially simultaneously. It is obvious that the condensers C are but one form of device that can be included in the cathode circuit of the tubes RT and actuated by the voltage drop across the shunted resistors CR, or by the current flow in these cathode circuits.

Further explanation will now be given how the current flow in these cathode circuits may be applied to control various forms of mechanisms, and more specifically the type selected for illustrative purposes, namely the tele-typewriting device.

Figure 8:
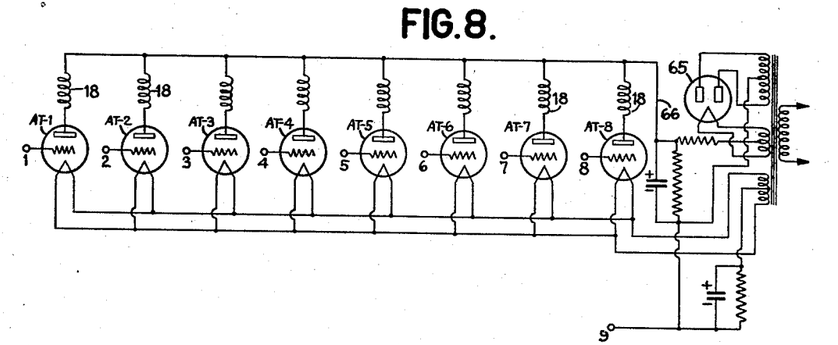
Fig. 8 is a circuit diagram of a power circuit that may be embodied in the invention.

Referring now to Figure 8, a plurality of power tubes AT are provided and adapted to normally be biased to cut-off. The cathodes and anodes of which are supplied by the standard potential source represented by the rectifier tube 65 and its associated circuits. The grids of the said tubes are connected to the respective terminals 1 to 8 in Fig. 9 and shown to be included in the cathode circuit of the RT tubes. The common terminal 9 already mentioned in conjunction with Fig. 9 is extended to the corresponding terminal shown in Fig. 8 to be connected to negative potential of the said supply. Positive potential of the supply source is applied to the common anode conductor 66 and included in each anode circuit is a magnet coil 18, the purpose of which was explained in conjunction with Fig. 1A, to depress its corresponding permutation bar 38 upon its energization. Thus, it is seen that the charged condensers C (Fig. 9) actuate the corresponding connected grids of the power tubes in Fig. 8 and allow a virtually steady plate current to pass through the windings of magnets 18, thereby operating them and in turn depressing corresponding permutation bars of the receiving translating unit.

Therefore, it is seen how the depression of a key bar 17 at the transmitting translating unit permits a signal composed of a combination code of impulses having similar characteristics to be transmitted practically simultaneously and upon reception to be selected or separated so as to actuate the controlling or driving means, one form of which is shown to be the condensers C, which in turn apply positive charges on the corresponding grids of the tubes AT to energize the electro-magnets embodied in its plate circuits to depress the corresponding permutation bars 38 at the receiver translating unit to permit a key bar 17 to be operated. It was pointed out how the operation of the key bar in both typewriting devices (transmitting and received) causes the cam operated devices to record the character selected.

It should be noted that the charges on the grids of the power tubes AT are maintained so long as the transmitting circuits are closed by the operating contacts therein in this particular description, contacts 44 Fig. 1B or 32, 33, and 34 Figs. 1 and 2. Due to the possible time constants by the condensers C—1 to 8 and resistors CR—1 to 8 (Fig. 9) the impulses applied to the grids of the power tubes AT are relatively long, thereby delivering sufficient power to the electromagnet 18 without overloading the tubes.

It has been found that it is desirable to be able to adjust the shifting of the described plurality of generated phases thereby permitting the adjustment and lining up the separate phases of the transmitting and receiving circuits. For example, even though the units are connected to a synchronized single phase network the transmitter or receiver frequency might drift to the extent that inaccurate signal representations are selected due to the out-of-phase relationship of the phase generators, and necessitate the shifting of the plurality of generated phases until aligned or in phase.

A simple expedient to attain this end is shown in the dotted section of Fig. 7 in which an additional transformer 70, the secondary of which is connected to the primary terminals of transformers AP and BP which it must be remembered are the phase generating transformers. Included in the primary circuit of the said transformer 70 is a variable inductance or choke coil 71 across the terminals of which is applied the single phase supply alternating current. It is seen then that if the receiving station is provided with such a phase shifting device the entire plurality of the generated phases may be shifted and set manually in accordance with the frequency shift and thus establish true inphase operating conditions.

For non-synchronous locations, that is at stations where the single phase supply at the transmitter is not in phase with the alternating current supply at the receiver, one method of establishing synchronism between the remotely situated stations is, in addition to transmitting the signals, to transmit a timing wave of predetermined frequency, for example, a 60 cycle timing wave, from the sending station. This wave can be filtered, as is well understood, from the transmitted signals, at the receiver, amplified to deliver the required power to generate the eight phases for the receiver, as explained hereinbefore, and in this manner the transmitter and receiver would always be in phase with each other.

Figure 10:
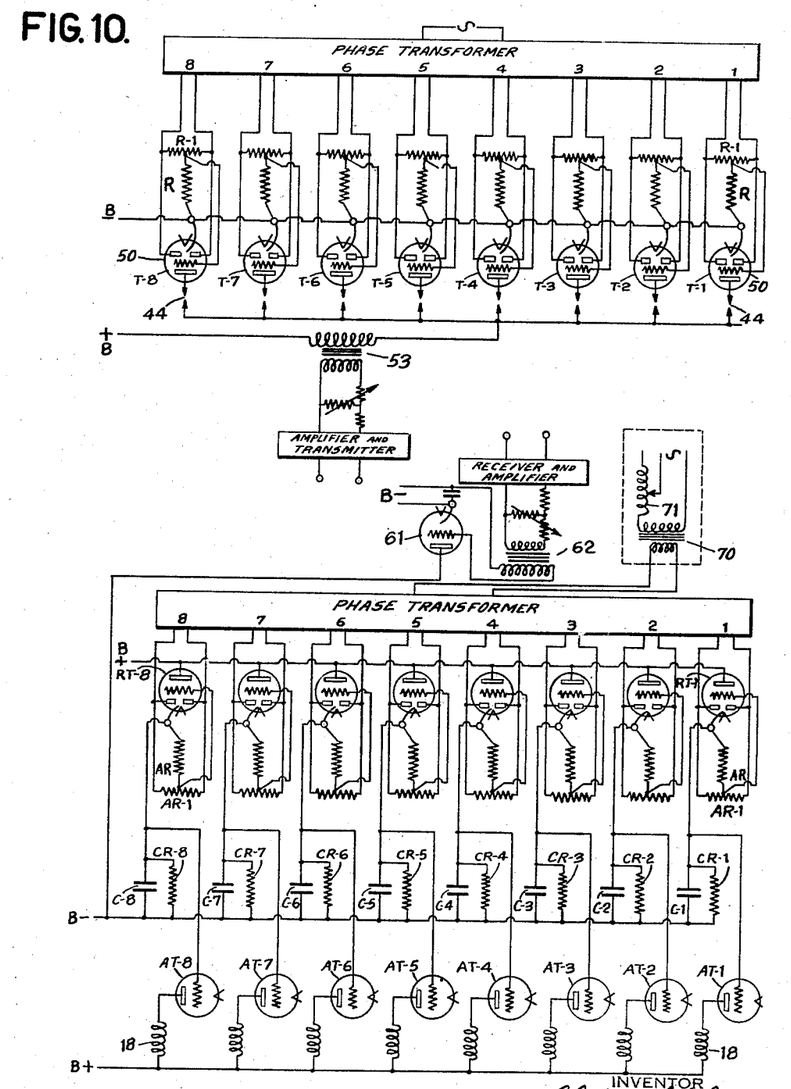
Fig. 10 shows schematically an assembly of the necessary elements of the transmitting and receiving circuits.

A brief summary of operation of the system will now be given and reference may be made to Fig. 10 which shows an assembly of the necessary elements thereof.

Upon operation of a plurality of the contacts 44, corresponding to the desired character code combinations, a plurality of impulses of different phases are initiated by the corresponding circuits embodying the tubes 50 (T—1 to T—8). The signal phases are generated by the phase transformer, shown schematically in the figure, from a single phase supply. The transformer output circuits are impressed individually on corresponding circuits embodying the tubes 50 which are adapted to function as full wave rectifiers and triodes to transform the out-of-phase currents into short signal impulses the characteristics of which are all similar.

The signal impulses are generated and impressed upon the connected network upon closure of the contacts 44, and are automatically spaced at equal timed intervals. It should be noted that during the short period the contacts 44 are rendered operative a plurality of signal impulses are generated by the corresponding connected circuits. Therefore, even though the impulses of the different circuits are initially generated and impressed upon the connected network in a definite timed relationship, the combination of selected impulses corresponding to a character are all impressed upon the network at the same time and transmitted simultaneously.

The selected signal impulses are then transmitted and impressed upon the receiving circuit, the phase transformer and impulse generating circuits, embodying tubes RT—1 to RT—8, all of which are similar to the circuits of the transmitting circuit. The out-of-phase signal impulses are impressed upon the high biased tube 61 and circuits embodying the tubes RT—1 to RT—8 to operate the corresponding tube circuits; that is, the circuits generating the signal impulses, the phases of which are similar to the received signal impulses. The corresponding condensers C—1 to C—8 are then charged to actuate the grids of the corresponding power tubes AT—1 to AT—8, thereby energizing the connected solenoids 18 to operate the associated character indicating or registering instrumentalities.

Therefore, by virtue of the disclosure herein, it will be understood that a translating system is provided wherein multi-unit or combinational signal codes may be used for transmission of indicia indications or representations at a rate exceeding that in the present day methods. It is to be noted that synchronous operation of the system is obtained without the use of rotating or mechanical equipment.

It has been shown how various types of translating units may initiate or set up or cause the generation of electrical representations, as for example the connected electrical impulses, simultaneously. Heretofore simultaneous initiation of a plurality of impulses or electrical representations necessitated the use of a plurality of frequencies, it is obvious from the description hereinbefore that the frequency of the impulses are of the same value. Another system of simultaneous initiation of impulses comprised the method of altering the wave fronts of the individual impulses, it is evident that the present invention departs from the principles of such systems. In fact the characteristics of the impulses or electrical representations are always the same and similar for each of the impulses, that is the wave fronts or forms of the impulses are not altered for each one so as to differentiate one from the other, instead the wave shapes of the electrical representations are always similar for each of the representative impulses, likewise, the signal impulses are always sustained for like time intervals, in contradistinction to systems employing impulses of differential time values, the amplitude of the signal waves are the same value for all, wave front and wave shapes are correspondingly the same, current densities and other characteristics always remain the same value for each of the separate pulses comprising the signals.

It is seen the system of the present invention is a type whereby signal indications comprising the combinational code impulses of similar characteristics may be initiated at the same time by any form of selecting or translating units and sent out practically simultaneously to actuate the receiving apparatus which is adapted to receive the said signal representations or impulses, additional means provided to separate the impulses received so that each of the separated impulses are adapted to actuate other selecting or translating units in accordance with the signal indications sent forward representing the particular selected indicia representations.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. The method of signaling which comprises selecting a predetermined number of current impulses in combination and differing in phase from each other for particular controlling purposes, applying the selected impulses to a transmission circuit in a particular timed relationship, and separating the out of phase impulses at the receiver to operate a controlled unit in accordance with the signal.

2. The method of signal transmission which comprises deriving a plurality of different phases from a source of alternating current in such a manner that a series of voltage peaks at accurately timed intervals is produced, determining by means of a combinational code system which impulses are to be transmitted from successive groups of voltage peaks, transmitting such impulses, receiving the transmitted impulses, and energizing a work circuit with the received impulses.

3. The method of signaling which comprises transforming a supply source of alternating current into a plurality of phase displaced currents, and converting the phase displaced currents into short signal impulses, then selecting combinations of said impulses to represent various characterizations, transmitting the selected impulses, receiving the impulses transmitted, and energizing a work circuit in accordance with the received impulses.

4. A communication system comprising a transmitting station and a receiving station, a fluctuating voltage supply at each station, means at the transmitting station to transform the said voltage supply thereat into a plurality of phase displaced signals and selective controlling means to initiate at variable times the phase displaced signals, signal selecting means at the receiving station including means to condition the selecting means in synchronism with the initiated signals by the voltage supply thereat to segregate the different phase displaced signals, and control means selectively controlled by the said signal selecting means upon reception of the phase displaced signals.

5. A communication system comprising a transmitting station and a receiving station, a plurality of electric discharge devices at each station, means to condition the devices at each station periodically, cyclically and independently with respect to each other to render the devices operative at mutually exclusive intervals, means at the transmitting station to control selectively the operation of the discharge devices to initiate variably timed signals, means to impress the said signals upon the discharge devices at the receiving station, and means at the receiving station controlled by the operation of the devices thereat upon reception of the signals, said devices segregating the signals to control selectively the said controlled means.

6. A communication system comprising a transmitting station and a receiving station, a source of phase displaced energy at each station, a plurality of electric discharge devices at each station, means at each station to impress the phase displaced energy upon the said discharge devices, respectively, to condition the devices periodically and cyclically to control the conductivity thereof at mutually exclusive intervals, means at the transmitting station to selectively render the devices thereat conductive to initiate variably timed signals, means at the receiving station to impress the said signals upon the said discharge devices thereat thereby selectively rendering the devices conductive, and means at the receiving station controlled by the said conductive devices thereat.

7. A communication system comprising a transmitting station and a receiving station, a plurality of control circuits at each station, static means at each station to condition the said respective circuits thereat periodically, cyclically and independently at mutually exclusive intervals to condition the respective circuits for energization thereof, means at the transmitting station to energize selectively said conditioned circircuits to initiate variably timed signals, and means at the receiving station to impress the said signals upon the said conditioned circuits thereat to energize them selectively, and means at the receiving station controlled by the said energized circuits thereat.

8. A communication system comprising a transmitting station and a receiving station, a plurality of electric discharge devices at each station, each of said discharge devices having input and output circuits, means at each station conductively connected to the input circuits of the respective discharge devices thereat to condition the devices periodically and cyclically to control the operation of the devices at mutually exclusive intervals, means, at the transmitting station, in the said output circuits of the said devices thereat controlled selectively to initiate variably timed signals, means at the receiving station to impress the said signals upon the discharge devices thereat, said devices segregating the incoming signals, and means, included in the output circuits of the said devices at the receiving station, controlled by the said segregated signals.

9. A communication system comprising a transmitting station and a receiving station, a plurality of thermionic devices, having control elements, at each station, means at each station to condition the control elements periodically and cyclically to control the conductivity of the devices, means, at the transmitting station, to selectively render the devices conductive thereby initiating variably timed signals, means, at the receiving station, to impress the said signals on the thermionic devices thereat including means to selectively render the devices conductive, and means at the receiving station controlled by the said conductive devices thereat.

10. A communication system comprising a transmitting station and a receiving station, a plurality of control circuits at each station, means at each station to condition the circuits thereat periodically and cyclically at mutually exclusive intervals for energization thereof, means at the transmitting station to control selectively the energization of the circuits thereat to initiate variably timed signals including means to initiate a series of said selected signals, means at the receiving station to impress the series of said signals upon the control circuits thereat selectively energizing the circuits, and means controlled and operated by said energized circuits including means to operate said controlled means only when a predetermined number of the signals of the series are impressed upon the control circuits.

11. A communication system comprising a transmitting station and a receiving station, a plurality of electric discharge devices at each station, means at each station to condition the devices thereat periodically and cyclically to control the operation of the devices at mutually exclusive intervals, means at the transmitting station to control selectively the devices thereat to initiate variably timed signals including means to initiate a series of said selected signals, means at the receiving station to impress the series of said signals upon the said devices thereat, and means at the receiving station controlled and operated by said devices thereat upon which the signals are impressed including means to operate said controlled means only when a predetermined number of the signals of the series are impressed upon the devices thereat.

12. The method of signaling by initiating and receiving variably timed signals which comprises conditioning signal channels at transmitting and receiving stations periodically and cyclically at mutually exclusive intervals thereby controlling the conductivity thereof and rendering the channels at the transmitting station conductive for initiating the signals and rendering the channels at the receiving station conductive for segregating the signals for controlling purposes thereat.

13. The method of signaling which comprises initiating variably timed signals at a transmitting station by rendering conductive signaling channels which are conditioned periodically, cyclically and independently and then impressing said signals at a receiving station upon signal receiving channels conditioned periodically, cyclically, independently and in synchronism with the incoming signals for segregating the signals for selective controlling purposes thereat.

CLYDE J. FITCH.